US010899241B2

(12) United States Patent
Ott et al.

(10) Patent No.: US 10,899,241 B2
(45) Date of Patent: Jan. 26, 2021

(54) CONNECTING ELEMENT AND CONNECTING APPARATUS FOR ELECTRICALLY CONNECTING A CABLE TO AN ELECTRICAL DEVICE OF A MOTOR VEHICLE

(71) Applicant: Bayerische Motoren Werke Aktiengesellschaft, Munich (DE)

(72) Inventors: Johannes Ott, Munich (DE); Juha Tauriainen, Munich (DE); Boris Zuev, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/445,720

(22) Filed: Jun. 19, 2019

(65) Prior Publication Data
US 2019/0305466 A1 Oct. 3, 2019

Related U.S. Application Data

(63) Continuation of application No. PCT/EP2017/077391, filed on Oct. 26, 2017.

(30) Foreign Application Priority Data

Dec. 20, 2016 (DE) .................. 10 2016 225 527

(51) Int. Cl.
*B60L 53/14* (2019.01)
*B60R 16/03* (2006.01)
(Continued)

(52) U.S. Cl.
CPC ............ *B60L 53/14* (2019.02); *B60L 53/302* (2019.02); *B60R 16/03* (2013.01); *H01R 13/46* (2013.01);
(Continued)

(58) Field of Classification Search
CPC .... H01R 13/46; H01R 13/04; H01R 2201/26; B60L 53/302; B60L 53/14; B60R 16/03;
(Continued)

(56) References Cited

U.S. PATENT DOCUMENTS 5,412,304 A * 5/1995 Abbott .................... H01F 38/14
320/108
5,909,099 A * 6/1999 Watanabe ............... H01F 38/14
320/108
(Continued)

FOREIGN PATENT DOCUMENTS

DE          103 23 170 A1    12/2004
DE    10 2015 100 347 A1     7/2016
(Continued)

OTHER PUBLICATIONS

PCT/EP2017/077391, partial English translation of International Search Report (PCT/ISA/210 and PCT/ISA/220) dated Jan. 25, 2018, enclosing Written Opinion of the International Searching Authority (PCT/ISA/237) (Twelve (12) pages).
(Continued)

*Primary Examiner* — Harshad C Patel
(74) *Attorney, Agent, or Firm* — Crowell & Moring LLP

(57) ABSTRACT

A connecting element for electrically connecting a cable to an electrical device of a motor vehicle includes a housing in which at least two electrical contacts are at least partially accommodated and a passage which extends from a first opening of the housing, through the housing, to a second opening of the housing and through which a coolant can flow. In order to allow an electrical connection which satisfies relatively stringent requirements, the electrical contacts are thermally coupled to the passage for active cooling by the coolant.

4 Claims, 1 Drawing Sheet

(51) Int. Cl.
*H01R 13/46* (2006.01)
*B60L 53/302* (2019.01)
*H01R 13/04* (2006.01)

(52) U.S. Cl.
CPC .......... *B60Y 2306/05* (2013.01); *H01R 13/04* (2013.01); *H01R 2201/26* (2013.01); *Y02T 10/70* (2013.01); *Y02T 10/7072* (2013.01); *Y02T 90/14* (2013.01)

(58) Field of Classification Search
CPC ............. B60Y 2306/05; Y02T 10/7005; Y02T 10/7072; Y02T 90/14
USPC .......................................... 439/485; 320/108
See application file for complete search history.

(56) References Cited

U.S. PATENT DOCUMENTS

| | | | | |
|---|---|---|---|---|
| 6,396,241 B1* | 5/2002 | Ramos | ................... | B60L 53/34 320/108 |
| 6,471,530 B1* | 10/2002 | Gimbatti | .............. | H01R 13/005 439/196 |
| 7,303,427 B2* | 12/2007 | Swain | ................... | H01R 12/716 361/694 |
| 8,350,526 B2* | 1/2013 | Dyer | ....................... | B60L 1/003 320/109 |
| 9,287,646 B2* | 3/2016 | Mark | ................... | H01R 13/005 |
| 9,321,362 B2* | 4/2016 | Woo | ......................... | B60L 53/11 |
| 9,451,723 B2* | 9/2016 | Lofy | .................. | H05K 7/20136 |
| 10,476,184 B2* | 11/2019 | Menez | ...................... | H01M 2/30 |
| 2013/0267115 A1* | 10/2013 | Mark | ...................... | B60L 53/18 439/485 |
| 2016/0221458 A1* | 8/2016 | Lopez | ................... | B60L 53/302 |

FOREIGN PATENT DOCUMENTS

| | | |
|---|---|---|
| EP | 1 870 288 B1 | 12/2007 |
| EP | 3 043 421 A1 | 7/2016 |
| WO | WO 2012/051510 A2 | 4/2012 |

OTHER PUBLICATIONS

German Search Report issued in German counterpart application No. 10 2016 225 527.4 dated Aug. 17, 2017, with Statement of Relevancy (Eight (8) pages).

* cited by examiner

CONNECTING ELEMENT AND CONNECTING APPARATUS FOR ELECTRICALLY CONNECTING A CABLE TO AN ELECTRICAL DEVICE OF A MOTOR VEHICLE

CROSS REFERENCE TO RELATED APPLICATIONS

This application is a continuation of PCT International Application No. PCT/EP2017/077391, filed Oct. 26, 2017, which claims priority under 35 U.S.C. § 119 from German Patent Application No. 10 2016 225 527.4, filed Dec. 20, 2016, the entire disclosures of which are herein expressly incorporated by reference.

BACKGROUND AND SUMMARY OF THE INVENTION

The invention relates to a connecting element and connecting apparatus for electrically connecting a cable to an electrical device of a motor vehicle. The connecting element comprises a housing and at least two electrical contacts, which are at least partially accommodated in the housing. The housing comprises a passage or channel, which extends from a first opening of the housing, through the housing, to a second opening of the housing, and through which a coolant can flow.

From EP 1 870 288 B1, a cable harness for a motor vehicle is known, having a plug connector for the connection of an electrical device which is installed in the motor vehicle. A hose runs through the plug connector and the cable harness, by means of which the electrical device is connectable to a cooling unit of the motor vehicle. The hose is provided with a thermally-insulating cladding of a heat-insulating material, thereby preventing any heat-up of the air for the cooling of the electrical device during its passage from the cooling unit through the hose.

DE 103 23 170 A1 describes a plug connector with a surrounding plug housing and an at least partially integrated electronic circuit, and an integrated cooling arrangement for the electronic circuit. The cooling arrangement can be integrated in the plug housing, wherein the plug housing can be configured such that it constitutes a heat sink.

The object of the present invention is the provision of an option for electrically connecting a cable to an electrical device which fulfills more stringent requirements than conventional electrical connections of this type.

A connecting element according to the invention for electrically connecting a cable to an electrical device of a motor vehicle comprises a housing, in which at least two electrical contacts are at least partially accommodated. The housing comprises a passage, which extends from a first opening of the housing, through the housing, to a second opening of the housing, and through which a coolant can flow. In order to permit an electrical connection which satisfies exceptionally stringent requirements, it is provided according to the invention that the electrical contacts of the connecting element, for the purposes of active cooling by means of the coolant, are thermally coupled to the passage. In other words, the connecting element is therefore penetrated by a cavity or passage, through which the coolant can run, flow or be delivered, in order to cool the electrical contacts, and thus additionally the connecting element. Accordingly, heat generated specifically on the electrical contacts is evacuated by the coolant, and is thus conveyed out of the region of the electrical contacts, and ultimately also out of the connecting element as a whole.

In the interests of clarity and comprehensibility, and without limiting generality, the first opening is to be understood hereinafter as the inlet or admission opening for the coolant, and the second opening of the housing is correspondingly to be understood as the outlet or discharge opening for the coolant. Regardless of this, the connecting element, specifically the housing, can additionally comprise one or more further openings. Specifically, the housing can comprise one or more further admission openings and/or one or more discharge openings for the coolant.

The thermal coupling or connection of the electrical contacts to the passage, within the meaning of the present invention, is to be understood and configured such that a major proportion of the heat generated by regulation electrical operation of the connecting element or the contacts can be evacuated by means of the coolant, where the latter flows through the passage. To this end, the passage can be routed or arranged, for example, in the vicinity of one or all of the electrical contacts. Specifically, the passage can be arranged in the immediate vicinity of, or immediately or directly adjacently to one, or more, or all of the electrical contacts of the connecting element. Moreover, between an electrical contact and the passage, or an inner space of the passage respectively, a heat-conducting element can be arranged, in order to permit the exceptionally effective and efficient transmission of heat from the respective electrical contact to the passage, specifically to the coolant. The heat-conducting element can be an additional component, or a specific subregion of the housing, configured in a corresponding manner. Specifically, the heat-conducting element or heat-conducting region can also constitute or form a wall of the passage. However, it is also possible for the housing to be entirely or partially constituted of a thermally conductive material, i.e., an exceptionally good heat-conducting material, such that subregions of the housing which are not directly arranged between the respective electrical contact and the passage can also contribute to the cooling of the electrical contacts. As a heat-conducting material, for example, a plastic having an above-average thermal conductivity for plastics, or a metallic material such as, for example, aluminum or copper, can be employed.

The connecting element can be, for example, a plug connector or part of a plug connector. It is also possible and/or can be provided that the connecting element is configured as or for a pin-and-socket or bayonet-and-socket connection or contact arrangement, or for the formation of a connection or contact arrangement of this type. The connecting element can thus be configured as part of a connection or contact arrangement of this type. However, the connecting element can also be configured, for example for the electrical connection of the cable to the electrical device, in the form of or by means of a screw contact, a butt contact or similar. If the connecting element is configured for use as or in a plug-in connection, an exceptionally simple handling of the cable and of a coolant line which is connected to the first opening is advantageously permitted accordingly. If the connecting element is employed for the formation of a screw connection, it can comprise, for example, a thread and/or a clamp or similar for this purpose. Configuration of the connecting element for the formation of, or for employment in, a screw connection can be particularly advantageous here, as an exceptionally secure connection of the cable to the device, which is proofed against either deliberate or inadvertent detachment, is achievable accordingly. Consequently, this is particularly advantageous, as any escape of coolant which might result in the damage of surrounding components can be prevented in an exceptionally reliable manner.

The option provided by the present invention for the active cooling of the connecting element and electrical contacts is particularly advantageous, especially in the light of the rising voltage and current ratings which are now in widespread use in the electrical systems of motor vehicles. By means of active cooling, advantageously, the current-carrying capacity of the electrical contacts can be increased, on the grounds that, by active cooling, a lower in-service temperature of the electrical contacts can be achieved, thereby resulting in a reduced electrical resistance. Additionally or alternatively, by means of active cooling, the size, specifically a cross section, of the electrical contacts can advantageously be reduced, whilst maintaining the same performance capability or current-carrying capacity. Consequently, for example, a greater number of electrical contacts, with no variation in size or spatial requirements, can be incorporated in the connecting element. Additionally or alternatively, where applicable, the connecting element itself can also be reduced in size.

Overall, by means of the active cooling of the electrical contacts or by means of the connecting element according to the invention, more stringent requirements with respect to current-carrying capacity or transmittable electric power and/or dimensions, or with respect to structural space or packaging, can be fulfilled. Nowadays, this is particularly advantageous, as the complexity of motor vehicles continues to be increased by the multiplicity of components and systems, and structural space is a critical factor in the design of new systems. It is further advantageous that, where applicable, resources such as, for example, copper for the electrical contacts, can be economized, together with the corresponding costs.

A further advantage of the connecting element according to the invention is provided in that the coolant—once it has flowed through the connecting element—can be routed directly to the electrical device via the second opening or discharge opening. An exceptionally simple serial cooling circuit, which is achievable with limited complexity, can thus be implemented accordingly. In other words, it is therefore possible in a simple manner, from a cooling circuit for the cooling of the device which would, for example, be present in any case, to arrange a tap-off, by means of which coolant is supplied to the connecting element. As a result, advantageously, no additional complete or dedicated cooling circuit is required for the connecting element.

As a coolant, for example, a known liquid medium such as, for example, water or oil can be employed, wherein, in principle, the use of a gaseous coolant or cooling agent is also possible. The selection of the coolant can be decided, in individual cases, in accordance with the respective thermal requirements.

In a further configuration of the present invention, it is provided that at least one of the electrical contacts is directly connected to the penetrable inner space of the passage, and is thus directly exposed to the stream of coolant. Accordingly, the term "passage" can also designate the clear space or volume which is penetrable or penetrated by the coolant, and does not necessarily comprise any wall, partition or delimitation of the volume. In this case, thermal coupling thus proceeds by way of direct contact or the direct engagement of the at least one electrical contact with the inner space or inner region. By means of the direct inflow, at least a subregion of the respective electrical contact is thus directly contacted by, or flushed in the coolant. Accordingly, an exceptionally effective, efficient and rapid heat transfer can advantageously be achieved from the directly flushed electrical contact towards or to the coolant. In the event of the direct flushing of one, or more, or all the electrical contacts, an electrically-insulating or non-conductive coolant such as, for example, an oil, is to be employed.

In a further advantageous configuration of the present invention, it is provided that the passage in the housing is branched into a plurality of channels, which converge again within the housing. In other words, the passage, downstream of its origin at the first opening, can be divided within the housing, such that the coolant penetrates or flows through the housing in a number of different paths. By the arrangement of the confluence or convergence of this plurality of different channels or flow paths within the housing, advantageously, an external structure or connection arrangement of the connecting element can be maintained exceptionally simply. In other words, by this arrangement, for example, a single discharge opening can suffice, through which the entire coolant flux flowing through the connecting element can be discharged. Accordingly, the corresponding requirements for, and complexity of, for example, a device-side coolant infeed can be restricted to the greatest possible degree. Naturally, however, it can also be possible to provide a plurality of discharge openings for the coolant on the connecting element. Any desired number of the plurality of channels can be routed to each of the discharge openings. Specifically, in addition, it can be provided that only a number or a sub-quantity of the plurality of channels converge within the housing, whereas one or a plurality of further channels are combined in a further confluence, or can also be routed individually to a further discharge opening.

The individual channels, into which the passage divides, can be of identical size and shape, which permits the achievement of uniform cooling. However, it can also be provided that one or more of the channels are of different sizes, shapes or cross sections, as a result of which a targeted distribution of the available cooling capacity can be achieved. For example, the size, shape, cross section and/or course of a respective channel can be dimensioned or configured in accordance with the size and/or anticipated heat generation of a respective electrical contact which—at least predominantly—is cooled by means of the respective channel. Depending upon the specific arrangement of the electrical contacts, a plurality of bifurcation or branching points of the passage can be provided, at which one or more channels respectively bifurcate. As a result, advantageously, an optimum adjustment of the passage and/or the delivery of coolant to the respective arrangement of electrical contacts can be achieved. By the branching of the passage, the surface area available for cooling or for the exchange of heat between the connecting element or the electrical contacts, on the one hand, and the coolant, on the other, can be advantageously enlarged, as a result of which cooling or the effective cooling capacity can be improved.

In a further advantageous configuration of the present invention, it is provided that at least one of the plurality of channels extends between two electrical contacts of the connecting element which are respectively arranged adjacently to one another. Exceptionally effective and efficient cooling or heat evacuation can, advantageously, be achieved accordingly.

In a further advantageous configuration of the present invention, it is provided that the first opening of the housing is configured as a connection for a coolant line, and is arranged at a distance from a housing-side connection point for the cable, such that the connecting element permits the independent connection of the coolant line and the cable to the connecting element. In other words, the coolant line and the cable can thus be routed to the connecting element via different paths. As a result, advantageously, an exceptionally high degree of flexibility and multifunctional capability of the connecting element are achieved. Moreover, for example, the replacement or repair of the cable and/or of the coolant line, or of the corresponding terminal or connection points, are facilitated. Additionally, by judicious arrangement—for example in consideration of a typical installation site—it can be prevented that any coolant escaping at the connection point of the coolant line enters into contact with the cable, thereby improving electrical safety.

In a further advantageous configuration of the present invention, it is provided that the connecting element and the electrical contacts are configured to connect the cable to a high-voltage device and/or to a high-voltage load of the motor vehicle. A high-voltage device, load or unit can include, for example, a traction battery, an electric drive system or a component of a charging system of the motor vehicle. A high voltage, or high-voltage range, within the meaning of the present invention is to be understood, for example, as a voltage range between 50 V and 1,000 V. In this case, the connecting element according to the invention, on the grounds of the significant heat generation associated with high voltages and correspondingly high power ratings, can be employed in a particularly beneficial and advantageous manner.

In principle, the connecting element according to the invention can be employed and applied in any electrical connection.

In a further advantageous configuration of the present invention, it is provided that the first and second opening of the housing, in at least one direction or dimension, are arranged on different sides of at least one of the electrical contacts. It is thus achieved that the coolant, in the corresponding direction or dimension, for example in the longitudinal or transverse direction of the respective electrical contact, flows or streams past or over the latter in its entirety. Accordingly, a contact surface and/or a time period required for the flux of coolant past the respective electrical contact can be maximized. Moreover, as a result, the effectiveness and/or efficiency of the evacuation of heat from the respective electrical contact can be enhanced.

In a further advantageous configuration of the present invention, it is provided that the connecting element additionally comprises at least one cooling element, specifically arranged on an outer side of the housing or on the passage. The cooling element can, for example, constitute or incorporate one or more cooling ribs, thereby further effectively increasing the available cooling capacity in or on the connecting element for the cooling of the electrical contacts. It is possible for the additional cooling element, in accordance with a passive functional or cooling principle, to discharge heat captured from the connecting element to the environment. However, it is also possible, by the arrangement of the cooling element on the passage, to increase the surface area which is immersed or flushed by the coolant, thereby improving the transfer of heat to the coolant.

A connecting apparatus according to the invention for the electrical connection of a cable to an electrical device of a motor vehicle comprises a connecting element according to the invention. The connecting apparatus moreover comprises a terminal element corresponding to the connecting element, configured for device-side arrangement, which incorporates at least one connecting element-side admission opening and one device-side discharge opening. The admission opening and the discharge opening of the terminal element—analogously to the first and second openings of the connecting element—are likewise interconnected by a passage, wherein this passage is also penetrable by the coolant. The admission opening is arranged in a regulation contact position, in which the connecting element is connected to the terminal element, on the second opening of the connecting element, such that the passage of the connecting element and the passage of the terminal element are penetrable by a continuous a coolant flux.

In other words, for the constitution of the electrical connection of the cable to the electrical device, the connecting element can be connected or coupled to the terminal element. In the contact position thus provided, the passages of the connecting element and the terminal element effectively constitute a single—at least insofar as delimited by couplings or similar—and continuous passage of correspondingly greater length, which extends from the first opening of the connecting element to the discharge opening of the terminal element. The discharge opening of the terminal element can constitute the connection or interface to a cooling circuit of the respective electrical device. By the two-part or multi-part configuration of the connecting apparatus, with the connecting element and the terminal element, it can advantageously be ensured that there is a leak-tight, secure and reliable connection both of electrical components and of the passages for the coolant or that one can be constituted in a simple manner.

The connecting apparatus can be configured, for example, as a plug-in connection or a screw connection between the connecting element and the terminal element.

In each case, the configurations of the connecting element according to the invention disclosed heretofore and hereinafter, and the corresponding advantages thereof, are correspondingly and analogously transferable to the connecting apparatus according to the invention, and vice versa. For this reason, the corresponding characteristics and properties are not specifically described again with respect to the connecting apparatus according to the invention.

In any event, the respective scope of application of the connecting element according to the invention and of the connecting apparatus according to the invention is not limited to applications in a cable harness of a vehicle. Rather, both the connecting element according to the invention and the connecting apparatus according to the invention can be employed, for example, in stationary installations or devices, or in other fields of application.

Further characteristics of the invention proceed from the claims, the figures and the description of the figures. The characteristics and combinations of characteristics specified in the above description, and/or the characteristics or combinations of characteristics specified below in the description of the figures and/or represented in the figures alone, are not only applicable in the respectively indicated combination, but also in other combinations, or in isolation.

The invention is described in greater detail hereinafter with reference to a preferred exemplary embodiment, and with reference to the figures.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
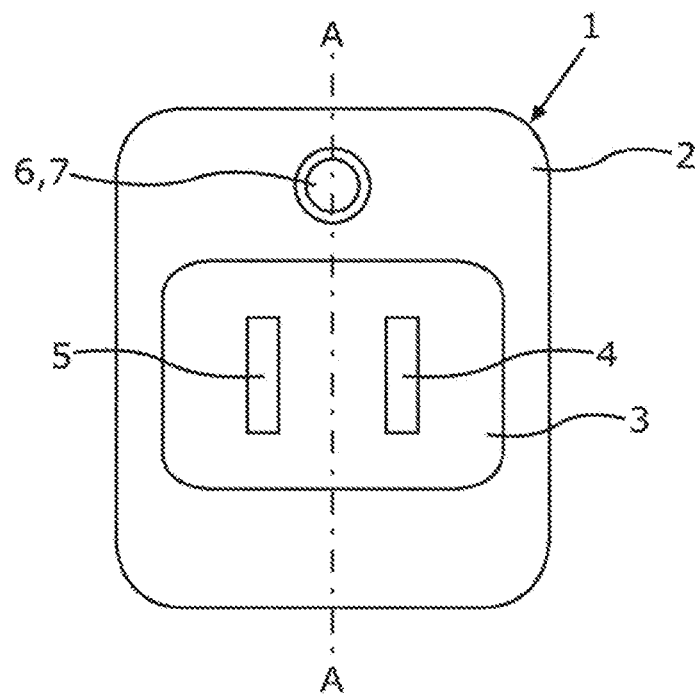
FIG. 1 shows a schematic representation of a front view of a connecting element according to one form of embodiment of the present invention, for the electrical connection of a cable to an electrical device of a motor vehicle.
Figure 2:
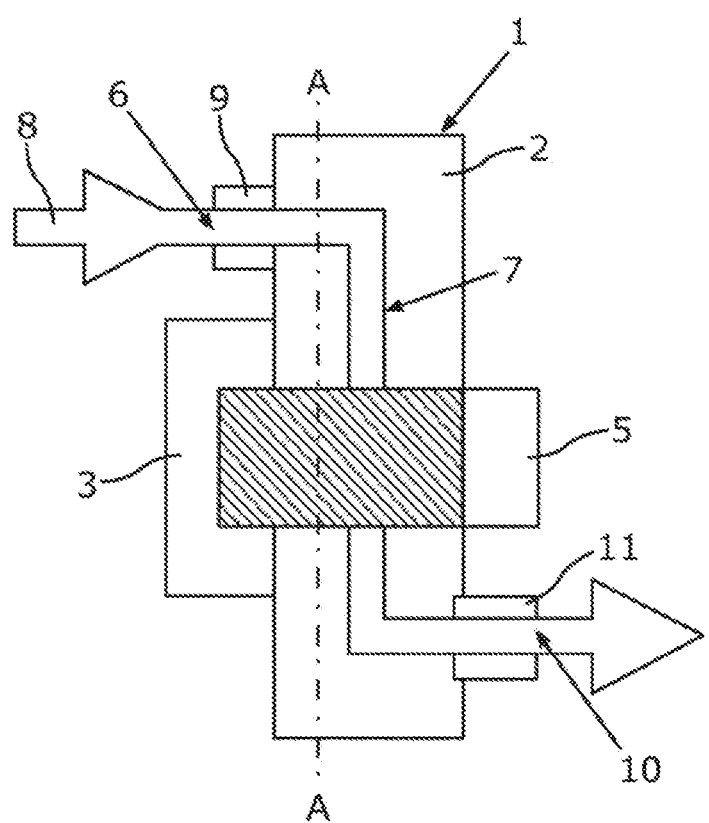
FIG. 2 shows a schematic representation of a side view of the connecting element represented in FIG. 1, in section.

Identical or identically functioning elements are respectively identified in FIG. 1 and FIG. 2 by the same reference numbers. In the interests of orientation, a guideline AA is plotted in both FIG. 1 and in FIG. 2.

A connecting element 1, represented in a schematic front view in FIG. 1, for the electrical connection of a cable to an electrical device of a motor vehicle comprises a housing 2. In the present case, neither the cable nor the electrical device is represented. The side of the connecting element 1 or the housing 2 represented in FIG. 1 is the cable-end side such that a cable actually connected to the connecting element 1 would, for example, project out of the drawing plane in this case. In the present case, for the connection or coupling of the cable to or onto the connecting element 1, the latter incorporates a cable terminal fitting 3. In or on this cable terminal fitting 3, for example, unrepresented cut-outs, clamps or comparable means for the accommodation, retention and/or fixation of the cable, or of individual conductors of the cable, can be provided. In the region of the cable terminal fitting 3, two electrical contacts 4, 5 of the connecting element 1 are arranged. By means of these electrical contacts 4, 5, in the regulation application of the connecting element 1, the electrical connection between the cable and the electrical device is constituted.

Above the cable terminal fitting 3, the housing 2, in a central region in the transverse direction, incorporates a first opening, which is designated here as the admission opening 6. The admission opening 6 constitutes a starting point of a passage 7 which adjoins the admission opening 6 on the housing side, and which constitutes or forms a cavity which passes through the housing 2. The cross section of the passage 7 can, for example, correspond to the cross section of the admission opening 6, although this is not necessary for the regulation operation of the connecting element 1. In the present example, both the admission opening 6 and the cross section of the passage 7 are circular, whereas, however, other shapes are also possible.

If, in the operation or employment of the connecting element 1, electric current flows via the electrical contacts 4, 5, heat is generated on the latter. As a result of this generation of heat, electric power which can be transmitted via the electrical contacts 4, 5, or via the connecting element 1, without causing damage, may be restricted. In the interests of increasing this power, or the current-carrying capacity of the electric contacts, and/or in order to permit a reduction in the size of the electrical contacts 4, 5 and/or of the housing 2, it is provided that, for the active cooling of the electrical contacts 4, 5, the passage 7 is penetrable by a coolant. To this end, the electrical contacts 4, 5 are thermally coupled to the passage 7.

FIG. 2 shows a schematic sectional side view of the connecting element 1 represented in FIG. 1. It can clearly be seen here that the passage 7 entirely penetrates the connecting element 1 or the housing 2 and, to this end, extends from the admission opening 6 to a discharge opening 10. The discharge opening 10 is arranged on a device-end side of the housing 2, opposite the reverse side of the housing 2 represented in FIG. 1. In the present case, for the active cooling of the electrical contacts 4, 5, the passage 7 is penetrated by a coolant flux 8. A direction of flux or flow of the coolant flux 8 is indicated by a corresponding arrow, and runs from the admission opening 6 through the passage 7 and past the electrical contacts 4, 5 to the discharge opening 10, where the coolant flux 8 leaves the connecting element 1.

The coolant flux 8 can, for example by means of a respective coolant line, which is not represented here, or by a respective coolant hose, be delivered to the connecting element 1 and evacuated from the latter. To this end, the connecting element 1 comprises respective line connections 9, 11 which enclose the admission opening 6 and the discharge opening 10. The respective coolant line can, for example, be arranged on these line connections 9, 11 by push-fitting, in order to constitute a reliable and leak-tight connection with the passage 7.

The passage 7 can be arranged to pass the electrical contacts 4, 5 such that at least one wall of the passage 7 is present between the coolant and the electrical contacts 4, 5. Accordingly, the electrical contacts 4, 5 can thus be electrically insulated from the coolant. Alternatively, however, the electrical contacts 4, 5 can also project into the passage 7, or at least in a subregion form the wall thereof. In this case, the electrical contacts 4, 5 can be flushed directly by the coolant.

Given that, specifically, the admission opening 6, and thus also the line connection 9 which is assigned thereto, are arranged at a distance from cable terminal fitting 3, the corresponding coolant line and the cable can advantageously be routed in a flexible and mutually independent manner. The line connection 9 can be configured to a round design, in the interests of achieving optimum compatibility with known and customary mating or connection systems for coolant hoses. For the connection of coolant hoses to the line connections 9, 11, for example, a screw connection, a clamp connection or similar can be provided. Sealing elements which are not represented here, for example a rubber gasket, a rubber ring or similar, can also be arranged on the line connections 9, 11.

In principle, however, for both the line connections 9, 11 and the openings 6, 10, and for the passage 7, shapes, cross sections, dimensions or dimensional ratios other than those explicitly indicated here are possible. Specifically, these properties can be selected with no resulting impact upon cable routing, or the routing of the coolant hose. Specifically, the size, cross section and/or course of the passage 7 can be determined in accordance with the spatial dictates of the connecting element 1 or of the housing 2, and/or the size, and/or the arrangement of the electrical contacts 4, 5. A flux-optimized configuration or arrangement of the passage 7 and of the openings 6, 10 can also be selected.

In order to further increase the quantity of heat which can be evacuated from the electrical contacts 4, 5, cooling elements, which are not represented here, can be arranged on the connecting element 1. In order to optimize the evacuation of heat, it can also be provided that the housing 2, either in its entirety, partially or sectionally, is formed of a plastic or of an exceptionally good heat-conducting material such as, for example, aluminum.

By way of illustration and clearer quantification, it is observed that the openings 6, 10 and the passage 7 can assume, for example, a diameter of 10 to 20 mm. In principle, the connecting element 1, or the arrangement described, or the described configuration of the forms of embodiment of the connecting element 1 represented, or further forms of embodiment thereof, are dimensionally scalable. Accordingly, the size of the connecting element 1 and its constituent parts can be adapted to the respective application purpose and the respective dictates of a wide variety of fields of application.

Overall, by means of the invention, an electrical connection with increased current-carrying capacity and/or a reduced spatial requirement, by means of smaller electrical contacts or a smaller overall contact system, can be achieved. Advantageously, a coolant circuit, which may be present in any case for the cooling of an electrical device, can be jointly employed for the cooling of electrical contacts. Advantageously, moreover, by means of improved cooling, a device-side or component-side saving of energy can be achieved.

LIST OF REFERENCE CHARACTERS

1 Connecting element
2 Housing
3 Cable terminal fitting
4, 5 Electrical contact
6 Admission opening
7 Passage
8 Coolant flux
9, 11 Line connection
10 Discharge opening The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A connecting element for electrically connecting a cable to an electrical device of a motor vehicle, comprising:
    a housing in which at least two electrical contacts are at least partially accommodated; and
    a passage which extends from a first opening of the housing, through the housing, and to a second opening of the housing, wherein a coolant is flowable through the passage;
    wherein at least a portion of the passage extends between the at least two electrical contacts such that the at least two electrical contacts are thermally coupled to the passage and such that the at least two electrical contacts are actively coolable by the coolant.

2. The connecting element according to claim 1, wherein the first opening of the housing is configured as a connection for a coolant line and is disposed at a distance from a housing-side connection point for the cable such that the connecting element permits independent connection of the coolant line and the cable to the connecting element.

3. The connecting element according to claim 1, wherein the first opening and the second opening of the housing, in at least one direction, are disposed on different sides of at least one of the at least two electrical contacts.

4. A connecting element for electrically connecting a cable to an electrical device of a motor vehicle, comprising:
    a housing in which at least two electrical contacts are at least partially accommodated; and
    a passage which extends from a first opening of the housing, through the housing, and to a second opening of the housing, wherein a coolant is flowable through the passage;
    wherein the at least two electrical contacts are thermally coupled to the passage such that the at least two electrical contacts are actively coolable by the coolant;
    wherein at least one of the at least two electrical contacts is directly connected to a penetrable inner space of the passage such that the at least one of the at least two electrical contacts is directly exposed to a stream of the coolant.

* * * * *